3,111,494
CATALYST PREPARATION
Robert J. Leak, Wappingers Falls, N.Y., and Morford C. Throckmorton, Akron, Ohio, assignors to Texaco Inc., New York, N.Y., a corporation of Delaware
No Drawing. Filed Dec. 8, 1960, Ser. No. 74,467
6 Claims. (Cl. 252—470)

This invention relates to a method of preparing a catalyst, and, more particularly, to a nickel-tungsten catalyst especially suitable for hydrogenation reactions, and to the improved catalyst obtained by the process. In a more specific aspect, the invention concerns a method of preparing a nickel-tungsten sulfide catalyst, and to the improved catalyst obtained thereby.

It has long been recognized that tungsten catalysts, especially tungsten sulfide usually in combination with certain other catalytically active metal sulfides, particularly nickel sulfide, are useful catalytic agents in hydrogenation reactions. Various methods have been proposed for preparing such catalyst, but the known available methods generally do not render an unsupported catalyst having a large total surface area per unit weight thereby resulting in a catalyst exhibiting relatively low activity. Moreover, the high cost of tungsten has limited considerably the commercial use of such catalytic materials. As a consequence, such combination metal catalysts are often supported by a carrier, usually inert catalytically, to obtain a larger exposed surface of the catalyst accompanied by an increase in activity.

It is therefore an object of the invention to provide a method for preparing an unsupported combination nickel-tungsten catalyst.

It is another object of the invention to provide a method for preparing an unsupported combination catalyst comprising a mixture of tungsten sulfide and nickel sulfide.

It is still another object of the invention to provide a catalyst of the above type characterized by a highly porous structure, and especially suitable for use in hydrogenation reactions, and for the removal of nitrogen and sulfur contaminants in petroleum and petroleum products.

Our invention involves broadly preparing an aqueous alkaline solution of a tungsten salt, an aqueous solution containing a nickel salt and an aqueous solution of an alkaline earth compound. The alkaline earth compound is advantageously incorporated in the nickel salt solution and dissolved therein, as explained hereinafter in greater detail. The nickel salt solution thus containing the dissolved alkaline earth compound is mixed with the alkaline tungsten salt solution and upon maintaining the mixed solutions at the proper pH range, oxidic compounds of the tungsten, nickel and alkaline earth metal are co-precipitated as an intimate mixture. Thereafter, the intimate mixture is recovered and subjected to suitable heating to stabilize the material for use as a catalyst. The resulting product is treated with an acid solution which dissolves out from the product the alkaline earth compound thereby resulting in a porous catalyst structure comprising tungsten oxide and nickel oxide. Where desired, the co-precipitated mixture may be sulfided, preferably prior to treatment with the acid solution, to convert the tungsten and nickel compounds to their corresponding metal sulfides.

The solution containing the alkaline earth compound may be prepared by dissolving the required amount of compound in a suitable aqueous solution, and this solution subsequently added to the nickel salt solution. However, many alkaline earth compounds, such as the oxides, hydroxides and carbonates are substantially insoluble, or only slightly soluble, in water but soluble in acidic aqueous solutions, and therefore are suitably dissolved in acidic aqueous solutions. In such a case, an aqueous solution of a mineral acid, for example, nitric acid, hydrochloric acid or sulfuric acid, may be used to dissolve the alkaline earth compound, or certain organic acids such as acetic acid also may be satisfactory. It is desirable, but not essential, that the added acid and nickel salt have the same anion. However, the anions introduced to the system should be compatible and not result in the formation of an insoluble salt of nickel or of the alkaline earth compound. In some instances, the acidity of the nickel salt solution may be sufficient to dissolve the alkaline earth compound, but a suitable acid may be added directly to this solution, and therefore the alkaline earth compound added directly to the nickel salt solution and dissolved therein. When the nickel salt solution, the alkaline earth compound solution and the alkaline tungsten salt solution are mixed in the desired proportions, and at a pH range of about 7 to 12, there results the simultaneous precipitation of oxidic compounds of the metals tungsten, nickel and alkaline earth, as explained hereinbelow in greater detail.

In carrying out the invention, the tungsten, usually available commercially as tungstic acid, is preferably dissolved in an aqueous ammonia solution to form a solution of ammonium tungstate. The amount of tungsten salt employed is dependent upon the molal ratio of tungsten to nickel desired in the final catalyst product. In a suitable procedure, a slurry of tungstic acid in water is reacted with ammonium hydroxide. An excess of ammonium hydroxide is employed to assure the substantially complete dissolution of the tungstic acid. Where desired, an aqueous solution of an alkali metal hydroxide may be used, for example, sodium hydroxide or potassium hydroxide, which requires, in such cases, stoichiometric proportions only of the acid and alkali metal hydroxide. Regardless of the alkaline substance employed for dissolving the tungsten or tungstic acid, it will be observed that the solution is strongly basic. Any insoluble materials, including unreacted tungstic acid, may be separated by filtering.

An aqueous solution of a soluble nickel salt may be prepared in any convenient manner. Any water-soluble nickel salt such as the nitrate, sulfate, chloride or acetate may be simply dissolved in water to obtain a nickel salt solution having the desired concentration. For purposes of our invention, nickel nitrate has been most suitable and may be prepared by dissolving the hexahydrate form in water. The amount of nickel salt employed will depend upon the molal ratio of nickel to tungsten desired in the final catalyst product. It is particularly desirable to employ a molal ratio of tungsten to nickel of about 1:6 up to about 3:1, although ratios outside of this range may be used.

Alkaline earth compounds employed in our invention include compounds of the alkaline earth metals, viz. magnesium, calcium, strontium and barium, and those considered particularly suitable include those from the group consisting of oxides, hydroxides and carbonates. The alkaline earth compound may advantageously be incorporated in the nickel salt solution, and when the alkaline earth compound is substantially insoluble in water but soluble in acidic solutions, the acidity of the nickel salt solution is usually sufficiently acidic to dissolve the desired amount of this compound. At least 0.5 mol percent, and preferably not less than 1 mol percent, of alkaline earth compound should be present in the total co-precipitate comprising an intimate mixture of oxidic compounds of tungsten, nickel and alkaline earth metals. A sufficiently porous structure as the final catalyst product is not formed where less than the minimum described amount of alkaline earth compound is employed. On the other hand, there appears to be no need to employ more than about 25 mol percent alkaline earth compound, and preferably up to about 10 mol percent, for there is no significant gain in catalytic activity where a greater amount of material is used.

The nickel salt solution having dissolved therein the alkaline earth compound advantageously has a pH such that when added to the above alkaline tungsten solution, the pH of the resulting solution will be from about 7 to 12. As explained above, it is generally convenient to dissolve the tungsten as tungstic acid with an excess of aqueous ammonia. To allow for this excess, a suitable amount of acid may be added to the nickel salt solution, if required, which added acid may also facilitate dissolving the alkaline earth compound especially when near maximum amounts of the compound are used. On the other hand, where a low molal ratio of tungsten to nickel is used, it may be necessary to add excess alkaline material to the alkaline tungsten solution to neutralize the acidic salt solution and render a final resulting solution having the desired pH range. Upon mixing of the alkaline tungsten salt solution with the acidic solution of nickel salt and alkaline earth compound in desired proportions, and at the desired pH, substantially insoluble oxidic compounds of the tungsten, nickel and alkaline earth metals present in the solution form and co-precipitate out of solution as an intimate mixture. If more convenient, the pH may be adjusted after the solutions have been mixed. The desired pH of the resulting solution for obtaining optimum simultaneous insolubilities is from about 7 to 12, and preferably from about 7 to 9. Although the precipitation is substantially complete, the solution may be concentrated by heating and evaporation.

The temperature at which the solutions may be mixed is about room temperature, or slightly below or above. In general, the solutions are maintained at a temperature of from about 35° F. to 200° F., and preferably from about 50° F. to 100° F.

The co-precipitate comprises an intimate mixture of oxidic compounds of the tungsten, nickel and alkaline earth metals. Although the actual form of the co-precipitate is not definitely known, it is believed that the tungsten is precipitated as the acid monohydrate and the nickel and alkaline earth are precipitated as their respective hydroxides. The co-precipitate may be separated from the remaining solution by decanting or filtering.

Generally, the co-precipitate is heat treated initially at a low temperature to expel any excess ammonia, acid and water, although this is not essential. This heat treatment is normally conducted at a relatively low temperature from about 300° F. to 600° F. Thereafter, the temperature may be increased to subject the co-precipitate to calcining thereby stabilizing the material for use as a catalyst and converting all the metal compounds to their corresponding oxides. Calcining is generally conducted in air at a temperature of from about 600° F. to 1500° F., preferably 900° F. to 1200° F., for a period of about 1 to 24 hours. However, to stabilize the product for use in catalytic reactions, the temperature employed in calcining should be at least as high as that used in the anticipated catalytic reaction, and calcining preferably is for a sufficient period of time to convert substantially all the metal compounds to their corresponding oxides.

The product is then treated with an acid solution which attacks and dissolves away the alkaline earth oxide. A dilute mineral acid, for example, nitric acid, sulfuric acid, or hydrochloric acid, or certain organic acids, such as acetic acid, may be employed. Thus, an aqueous solution containing not less than about 2% by weight of suitable acid, and preferably not more than about 20% by weight, may be satisfactorily employed, and the product treated with the dilute acid for a sufficient time to dissolve out the major portion, or substantially all, of the alkaline earth compound. The resulting porous structure consisting essentially of nickel oxide and tungsten oxide is then washed with water and dried. The mixed metal catalyst may be crushed or granulated to the desired mesh size, and where desired, compressed into tablets or pellets.

In one specific aspect of the invention, the resulting co-precipitated mixture is sulfided, preferably, but not necessarily, prior to the above-described treatment with an acid solution to dissolve out the alkaline earth oxide. In the preferred embodiment, the co-precipitated mixture is contacted with hydrogen sulfide, at elevated temperatures and for a long enough period of time to convert the tungsten oxide and nickel oxide to their corresponding metal sulfides. The temperature employed during sulfiding with a hydrogen sulfide stream may range from about 500° F. to 1200° F. Conversion may usually be completed in about 1 to 12 hours. When the desired sulfiding has been attained, the material is allowed to cool and purged in an inert atmosphere, preferably nitrogen. The resulting product may then be treated with an acid solution to dissolve out the alkaline earth oxide, and subsequently washed with water, dried and pelletized, if desired, as described above.

The mixed metal catalyst described above is especially active for use as a hydrogenation catalyst and for removal of nitrogen and sulfur contaminants present in petroleum and petroleum products, for example, gas oil or shale oil.

As illustrative of the process of the present invention the following examples are given:

303 grams of tungstic acid were added, with stirring, to two liters of water having dissolved therein 101 grams of sodium hydroxide. The solution was heated slightly to facilitate dissolution. A second solution was prepared by dissolving 640 grams of nickel nitrate hexahydrate and 6.8 grams of magnesium oxide in five liters of water to which had been added 14 milliliters of nitric acid. Sufficient water was added to the alkaline tungsten solution so that the volume of this solution was approximately the same as the volume of nickel salt solution. The two solutions were mixed thereby resulting in a co-precipitate of oxidic compounds of tungsten, nickel, and magnesium. The pH of the resulting solution was 7. The co-precipitate was dried on a steam plate and granulated to about 50 mesh.

A second batch was prepared as above, and the co-precipitates resulting from each preparation were combined, and the combined material then sulfided in a hydrogen sulfide stream at 700° F. for six hours to convert the tungsten and nickel compounds to their corresponding sulfides. After cooling and purging the product with nitrogen, the product was washed, with stirring, with a dilute solution of nitric acid prepared by adding 500 milliliters of nitric acid containing about 70% by weight $HNO_3$ to 5 liters of water to dissolve out a major portion of the magnesium oxide. The product was allowed to maintain in contact with the dilute nitric acid solution for about one-half hour. The product was sulfided again at 700° F. and for six hours, and then cooled and purged as above. The product was pelletized into $5/32$ inch pellets. This preparation produced approximately 803 grams of catalyst material of about 40% by weight nickel sulfide and 60% by weight tungsten sulfide.

Shale oil feed stock containing 0.80% basic nitrogen as a contaminant was subjected to hydrogenation in six different tests, each conducted at 750° F. and 1000 p.s.i.g. A nickel sulfide-tungsten sulfide catalyst prepared substantially as shown in the above procedure was employed in each test. The results showing a substantial decrease in basic nitrogen are set forth in the table below:

| Alkaline Earth Oxide Used in Preparing Catalyst | Removal of Basic Nitrogen | |
|---|---|---|
| | Mol Percent of Alkaline Earth Oxide | Weight Percent Basic $N_2$ in Product |
| MgO | 1 | 0.21 |
| | 5 | 0.35 |
| CaO | 1 | 0.24 |
| | 5 | 0.35 |
| BaO | 1 | 0.22 |
| | 5 | 0.29 |

Having described our invention, and certain embodiments thereof, we claim:

1. A method for preparing a porous nickel-tungsten catalyst which comprises mixing together an aqueous alkaline solution of a tungsten salt, an aqueous solution of a nickel salt and an aqueous solution of an alkaline earth compound selected from the group consisting of oxides, hydroxides and carbonates, maintaining the resulting solution at a pH of from about 7 to 12 to co-precipitate an intimate mixture of oxidic compounds of said tungsten, nickel and alkaline earth, said intimate mixture containing not less than about 0.5 mol percent of alkaline earth, and treating the resulting product with an acidic solution which dissolves said alkaline earth from said intimate mixture, said resulting product having a molal ratio of tungsten to nickel of about 1:6 to about 3:1.

2. A method for preparing a porous nickel-tungsten catalyst which comprises mixing together an aqueous alkaline solution of a tungsten salt, an aqueous solution of a nickel salt and an aqueous solution of alkaline earth compound selected from the group consisting of oxides, hydroxides and carbonates, maintaining the resulting solution at a pH of from about 7 to 12 to co-precipitate an intimate mixture of oxidic compounds of said tungsten, nickel and alkaline earth, said intimate mixture containing not less than about 0.5 mol percent alkaline earth, and treating the resulting product with a dilute aqueous acid solution containing not less than about 2 percent by weight acid which dissolves said alkaline earth from said intimate mixture, said resulting product having a molal ratio of tungsten to nickel of about 1:6 to about 3:1.

3. A method of preparing a porous nickel-tungsten catalyst which comprises preparing an aqueous alkaline solution of a tungsten salt, mixing therewith an aqueous acid solution containing a dissolved nickel salt and an alkaline earth compound selected from the group consisting of oxides, hydroxides and carbonates soluble in an acidic solution and substantially insoluble in water, maintaining the resulting solution at a pH of from about 7 to 12 to co-precipitate an intimate mixture of oxidic compounds of said tungsten, nickel and alkaline earth, said intimate mixture containing not less than about 0.5 mol percent alkaline earth, heating said intimate mixture to stabilize said intimate mixture for use as a catalyst, and treating the resulting product with a dilute aqueous acid solution containing not less than about 2 percent by weight acid which dissolves said alkaline earth from said intimate mixture, said resulting product having a molal ratio of tungsten to nickel of about 1:6 to about 3:1.

4. A method for preparing a porous catalyst of sulfides of nickel and tungsten which comprises mixing together an aqueous alkaline solution of a tungsten salt, an aqueous solution of a nickel salt and an aqueous solution of an alkaline earth compound selected from the group consisting of oxides, hydroxides and carbonates, maintaining the resulting solution at a pH of about 7 to 12 to co-precipitate an intimate mixture of oxidic compounds of said tungsten, nickel and alkaline earth, said intimate mixture containing not less than about 0.5 mol percent of alkaline earth, sulfiding the resulting intimate mixture to convert the tungsten and nickel compounds to their corresponding metal sulfides, and treating the resulting product with an acidic solution which dissolves said alkaline earth from said intimate mixture, said resulting product having a molal ratio of tungsten to nickel of about 1:6 to about 3:1.

5. A method for preparing a porous catalyst of sulfides of nickel and tungsten which comprises mixing together an aqueous alkaline solution of a tungsten salt, an aqueous solution of a nickel salt and an aqueous solution of an alkaline earth compound selected from the group consisting of oxides, hydroxides and carbonates, maintaining the resulting solution at a pH of from about 7 to 12 to co-precipitate an intimate mixture of oxidic compounds of said tungsten, nickel and alkaline earth, said intimate mixture containing not less than about 0.5 mol percent alkaline earth, sulfiding the resulting intimate mixture to convert the tungsten and nickel compounds to their corresponding metal sulfides, and treating the resulting product with a dilute aqueous acid solution containing not less than about 2 percent by weight acid which dissolves said alkaline earth from said intimate mixture, said resulting product having a molal ratio of tungsten to nickel of about 1:6 to about 3:1.

6. A method of preparing a porous catalyst of sulfides of nickel and tungsten which comprises preparing an aqueous alkaline solution of a tungsten salt, mixing therewith an aqueous acid solution containing a dissolved nickel salt and an alkaline earth compound selected from the group consisting of oxides, hydroxides and carbonates soluble in an acidic solution and susbtantially insoluble in water, maintaining the resulting solution at a pH of from about 7 to 12 to co-precipitate an intimate mixture of oxidic compounds of said tungsten, nickel and alkaline earth, said intimate mixture containing not less than about 0.5 mol percent alkaline earth, heating said intimate mixture to stabilize said intimate mixture for use as a catalyst, sulfiding the resulting intimate mixture to convert the tungsten and nickel compounds to their corresponding metal sulfides, and treating the resulting product with a diluent aqueous acid solution containing not less than about 2 percent by weight acid which dissolves said alkaline earth from said intimate mixture, said resulting product having a molal ratio of tungsten to nickel of about 1:6 to about 3:1.

References Cited in the file of this patent

UNITED STATES PATENTS 2,595,772    Daussat et al.             May 6, 1952